United States Patent
Narusawa (10) Patent No.: US 6,605,127 B2
(45) Date of Patent: Aug. 12, 2003

(54) METHOD OF MANUFACTURING AN ALUMINUM SOLID ELECTROLYTE CAPACITOR

(75) Inventor: Hitoshi Narusawa, Oume (JP)

(73) Assignees: Shoei Co., LTD, Tokyo (JP); Adphox Corporation, Tokyo (JP)

( * ) Notice: Subject to any disclaimer, the term of this patent is extended or adjusted under 35 U.S.C. 154(b) by 0 days.

(21) Appl. No.: 09/898,046

(22) Filed: Jul. 5, 2001

(65) Prior Publication Data

US 2003/0008531 A1 Jan. 9, 2003

(51) Int. Cl.[7] .............................. H01G 9/00; H01G 7/00
(52) U.S. Cl. ....................... 29/25.03; 29/25.42
(58) Field of Search .................. 29/25.01, 25.02, 29/25.03, 25.41, 25.42; 361/523, 524, 525, 528, 529, 535, 536, 537, 539; 205/80, 148

(56) References Cited

FOREIGN PATENT DOCUMENTS

| EP | 0 691 664 A1 | 1/1996 |
|----|---|---|
| JP | 8-78287 | 3/1996 |
| JP | 10-50558 | 2/1998 |
| JP | 10-50560 | 2/1998 |

OTHER PUBLICATIONS

Patent Abstracts of Japan, JP 10 050558, Manufacture of Solid State Electrolytic Capacitor, Feb. 20, 1998, vol. 017, No. 06.
Patent Abstracts of Japan, JP 05 109582, Manufacture of Resin–Sealed Oil–Impregnated Capacitor, Apr. 30, 1993, vol. 017, No. 463.
European Search Report, Feb. 8, 2002, pp. 1–3.

Primary Examiner—Evan Pert
(74) Attorney, Agent, or Firm—Staas Halsey LLP (57) ABSTRACT

In a method of manufacturing an aluminum solid electrolyte capacitor, mass-production of aluminum solid electrolyte capacitors with high reliability and excellent quality is made possible by adopting a sequence of steps whereby it is ensured that no stress is applied to the capacitor body (for example coiled element), and by providing means that make possible implementation of these steps. A capacitor body 1 is inserted into a case 3 having a first aperture 3A that is open at the bottom and a second constricted aperture 3B at the top, via the first aperture 3A, and sealing and fixing are performed by a sealant 5 consisting of an epoxy resin, then the capacitor body 1 is coated or impregnated by introducing 3,4-ethylenedioxy-thiophene through the second aperture 3B, then solid electrolyte constituted by poly(3,4-ethylenedioxy-thiophene) is generated by an oxidative polymerization reaction, after which the second aperture 3B is sealed.

12 Claims, 7 Drawing Sheets

METHOD OF MANUFACTURING AN ALUMINUM SOLID ELECTROLYTE CAPACITOR

BACKGROUND OF THE INVENTION

1. Field of the Invention

The present invention relates to a method of manufacturing an aluminum solid electrolyte capacitor whereby a product of high reliability can be mass-produced.

2. Description of the Related Art

In the aluminum electrolytic capacitors which are generally employed in large quantity, the positive electrode foil is constituted by etching aluminum foil to increase its surface area and generating an oxide film thereon by subjecting this to chemical conversion treatment; for the negative electrode foil, untreated aluminum foil is employed and an element (hereinbelow termed "coiled element") is constituted by coiling the positive electrode foil and negative electrode foil with a separator such as Manila paper therebetween; the element is completed by impregnating with liquid electrolyte (for the essentials, see Laid-open Japanese Patent Application Publication No. H. 8-78287).

In recent years, aluminum solid electrolyte capacitors have been commercialized in which a conductive polymer material is employed as electrolyte instead of the liquid electrolyte in an aluminum electrolytic capacitor as aforesaid.

The solid electrolyte in an aluminum solid electrolyte capacitor has the characteristic advantage that its electrical conductivity is higher than that of the liquid electrolyte in an aluminum electrolytic capacitor, so losses are smaller and the frequency characteristic and temperature characteristics are excellent.

However, in contrast to aluminum electrolytic capacitors, the oxide film on the positive electrode has no self-repairing action, so if a defect is produced in the oxide film on the positive electrode, there is a high probability of a short-circuit mode fault being produced.

Usually, when a short-circuit occurs in a capacitor employed in electrical equipment, an abnormal current flows; this involves a risk of causing a fire in the electronic equipment. Accordingly, in the case of aluminum solid electrolyte capacitors, capacitors are employed in which the voltage-withstanding ability of the oxide film on the positive electrode is set to be about three times higher than in an aluminum electrolytic capacitors, but this causes the capacity to be reduced to about ⅓.

Apart from this problem, when an aluminum solid electrolyte capacitor is manufactured by applying the prior art (see for example Laid-open Japanese Patent Application Publication No. H. 10-50558 or Laid-open Japanese Patent Application Publication No. H. 10-50560), the oxide film on the positive electrode is subjected to a chemical conversion treatment again ("repeat chemical conversion" treatment) after the coiled element is produced, and before it is incorporated and fixed in the case.

Figure 7:
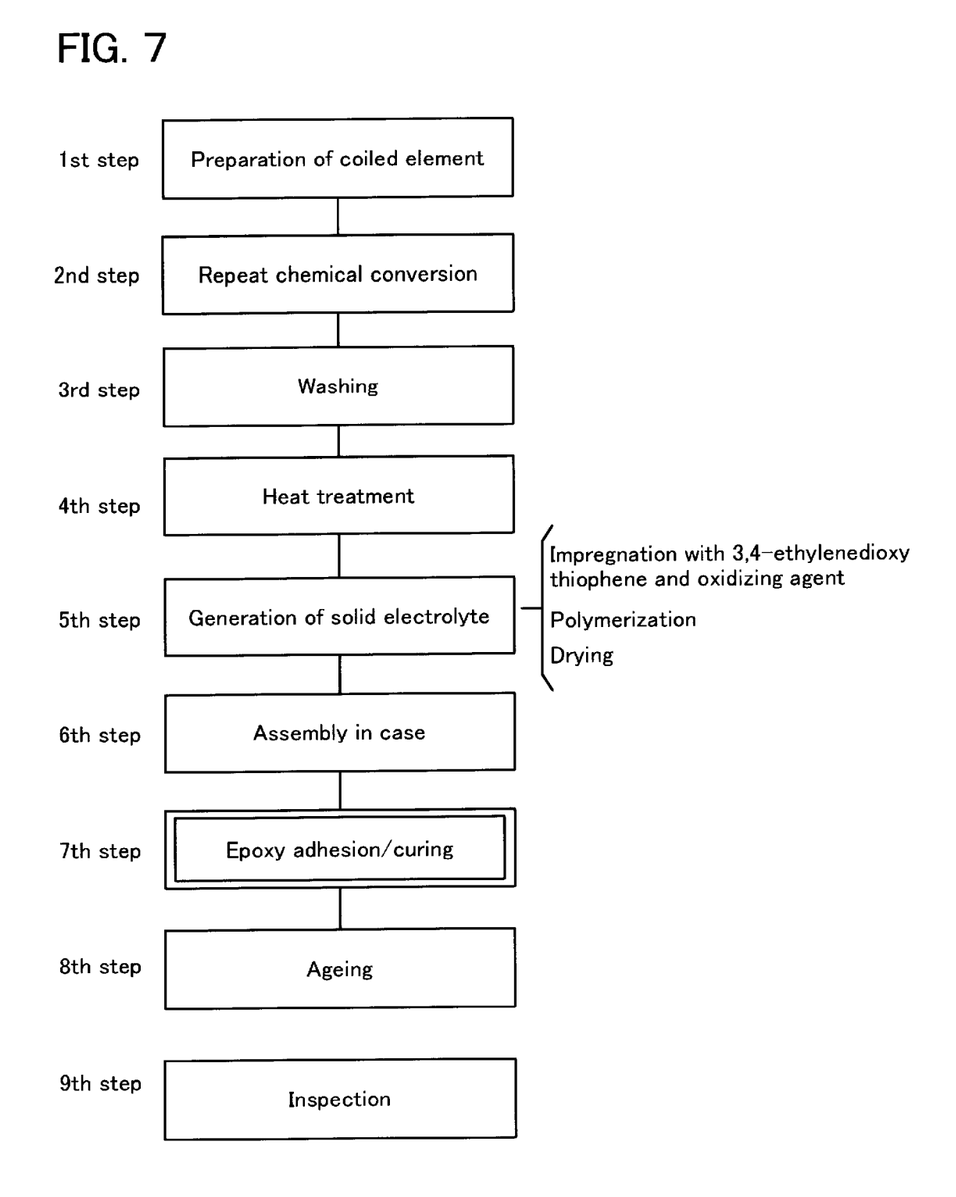
FIG. 7 is a flow chart given in explanation of the steps of manufacturing a conventional aluminum solid electrolyte capacitor.

FIG. 7 is a flow chart given in explanation of the steps involved in manufacturing a prior art aluminum solid electrolyte capacitor. First of all, in a first step, a coiled element is produced comprising a positive electrode foil formed with an oxide film by chemical conversion, a separator, and a negative electrode foil; in a second step, the oxide film of the positive electrode foil is subjected to repeat chemical conversion to repair any defects; in a third step, it is subjected to washing; in a fourth step, heat treatment is performed; in a fifth step, a solid electrolyte is generated; in a sixth step, this is assembled into the case; in a seventh step, the coiled element and case are stuck together by epoxy resin and curing is performed; in an eighth step, ageing is performed; and in a ninth step inspection is carried out.

In the process of FIG. 7 mentioned above, there is the problem that, even if the oxide film on the positive electrode is perfectly formed by the repeat conversion of the second step, if any kind of stress acts on the coiled element during the period from the subsequent third step to the seventh step i.e. from the washing as far as the incorporation in the case, cracks can easily be generated in the oxide film on the positive electrode.

Specifically, when the coiled element is incorporated in the case, until adhesion and curing of the epoxy resin have been achieved, the lead terminals of the coiled element can move easily and also the coiled element itself is weak and easily deformed by external force, so handling in such a way that no stress acts on the electrode foil is difficult to achieve and furthermore the oxide film on the positive electrode is as extremely thin as 1.3 (nm/V), so even if the utmost care is taken in each step, the defect rate is high and may reach 5 (%) to 50 (%); thus the reliability is low.

SUMMARY OF THE INVENTION

According to the present invention, a sequence of steps is adopted that makes it possible to avoid application of stress to the capacitor body (for example coiled element) when manufacturing an aluminum solid electrolyte capacitor and there are provided means that make it possible to execute these steps, thereby enabling mass production of aluminum solid electrolyte capacitors of high reliability and excellent quality.

The basis of the present invention lies in that, at the stage where the capacitor body for the aluminum solid electrolyte capacitor is completed, its assembling into the case is immediately performed, together with curing and adhesion with resin, thereby fixing the coiled element at the initial stage of the steps and preventing stress from being applied to the oxide film on the positive electrode; in order to perform such a step, a case is required having an aperture that makes possible performance of the various processing steps after curing and adhesion of the resin around the lead terminals in the coiled element; such a case is disclosed in Japanese Patent Application Number H. 7-135116 (Laid-open Japanese Patent Application Number H. 8-78287).

Figure 1:
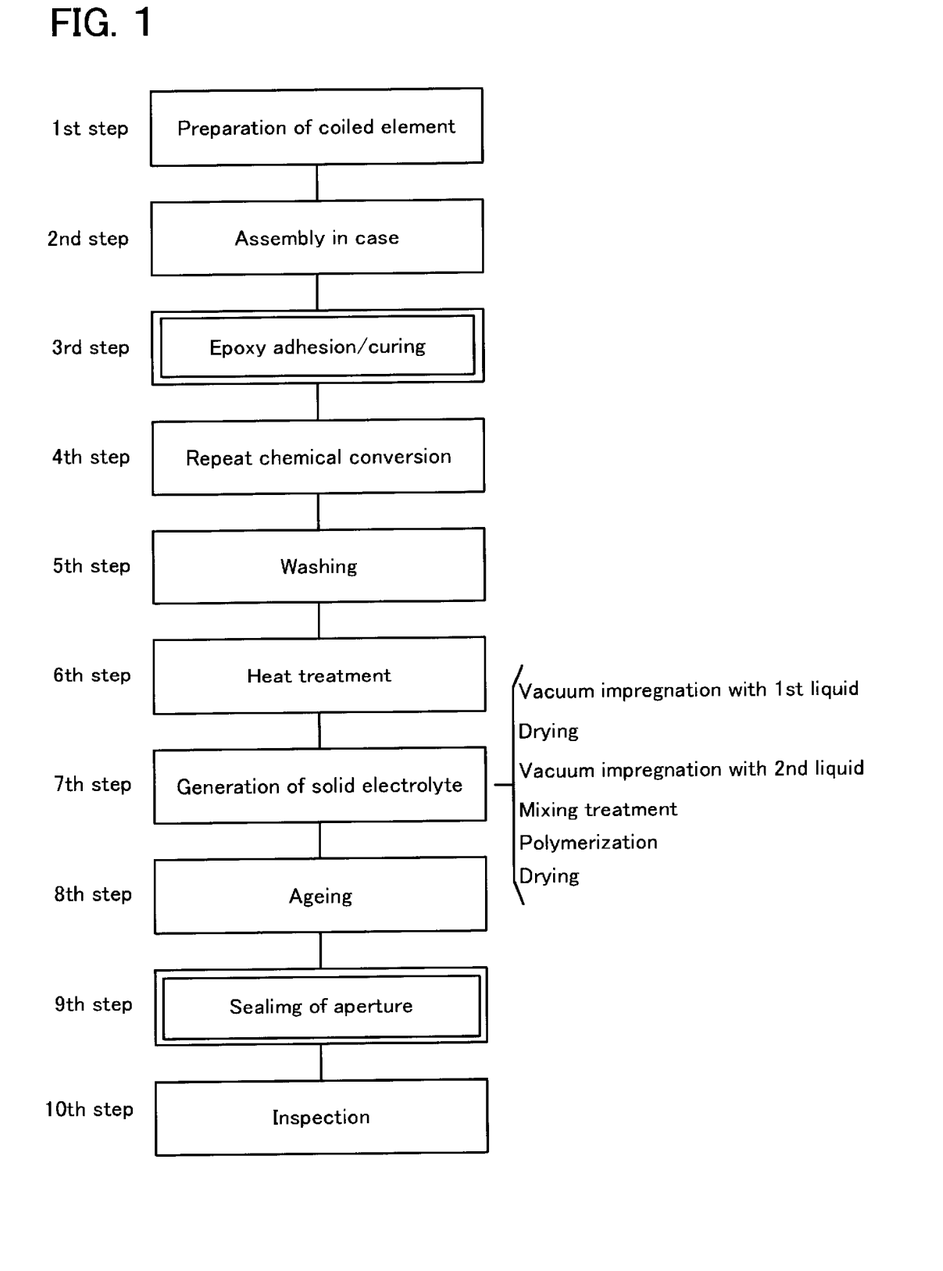
FIG. 1 is a flow chart given in explanation of an example of steps for manufacturing an aluminum solid electrolyte capacitor according to the present invention.

FIG. 1 is a flow chart given in explanation of an example of the steps involved in manufacturing an aluminum solid electrolyte capacitor according to the present invention. In the first step, a coiled element comprising a positive electrode foil with oxide film formed thereon by chemical conversion, a separator and an electrode foil is produced; in the second step, the coiled element is assembled through the first aperture in a case having a first aperture and a second aperture; in the third step, adhesion of the coiled element and the case is effected at the first aperture with an epoxy resin, followed by its curing; in the fourth step, defects are repaired by repeat chemical conversion of the oxide film of the positive electrode foil; in the fifth step, washing is performed; in the sixth step, heat treatment is carried out; in the seventh step the solid electrolyte is generated; in the eighth step ageing is performed; in the ninth step the second aperture is sealed; and the product is completed by inspection in the tenth step. The chief varieties of aluminum solid electrolyte capacitors are capacitors in which a coiled element is employed as described above and capacitors in which the electrodes are of a flat plate shape; including these cases, parts which are present in the case are collectively called the "capacitor body"; in this construction, a portion of the lead terminals is also included in the "capacitor body".

As described above, according to a first aspect of the present invention, a method of manufacturing an aluminum solid electrolyte capacitor comprises:

a step of fixing a capacitor body (for example capacitor body 1 of FIG. 2, to be described) within a case (for example case 3 of FIG. 2, to be described) having one or more apertures; and a step of generating solid electrolyte by introducing a raw material of solid electrolyte from any of these apertures, coating or impregnating the capacitor body therewith, and inducing an oxidative polymerization reaction.

The aforesaid one or more apertures can be employed as introduction ports when the capacitor body is arranged within the case. If this is done, it is important that the aperture is of a size that is capable of allowing passage of the capacitor body. However, this is not necessary if the capacitor body is arranged within the case by some other methods.

Other roles possessed by the one or more apertures referred to above comprise the role of a port through which air or a gas is evacuated from the interior of the case and the role of being employed as entry ports when the various liquids, described below, are introduced into the case. In this case, the apertures may be small so long as evacuation from within the case is possible and introduction of liquid into the case is feasible. A plurality of such apertures may be provided. The locations where these are arranged are not restricted to the end of the case as shown in FIG. 2, to be described, but could also be the side of the case.

In the above description, "fixing" means that the capacitor body is made unable to move freely within the case. Regarding the material employed for this fixing, any material may be employed so long as it is non-conductive; various types of resin product may be employed.

In particular, application of liquid resin followed by its solidification so as to fix the capacitor body and to seal the capacitor body in a way that the interior of the case is divided into two zones by solidification, is useful when introducing liquid utilizing pressure difference, as will next be described.

Figure 2:
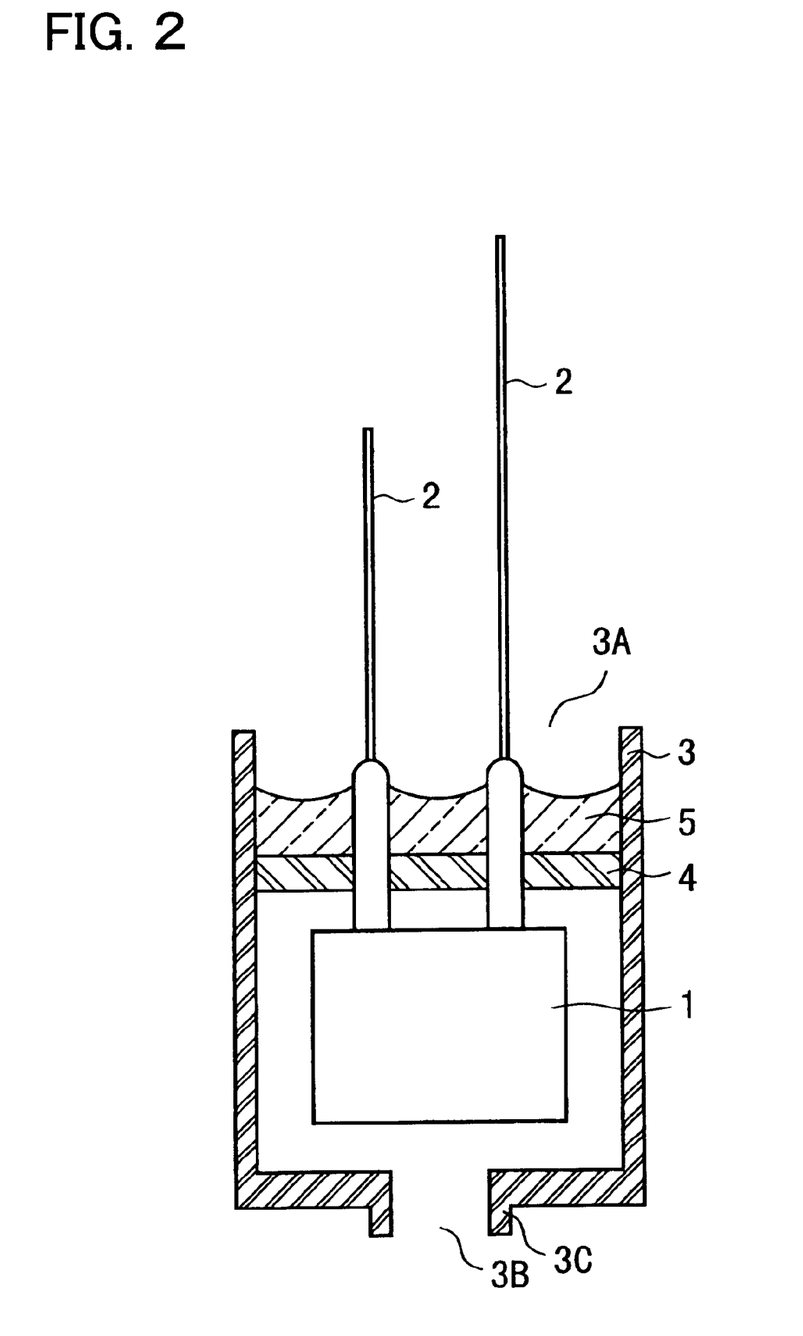
FIG. 2 is a detail cross-sectional side view illustrating an aluminum solid electrolyte capacitor at the stage where the third step according to the present invention has been completed.

Preferably, in this case, a capacitor body is inserted into a case from one of said one or more apertures (in the specification of this application, this will be called the first aperture, for example first aperture 3A of FIG. 2, to be described), and in the step of fixing the capacitor body, sealing is effected together with the fixing;

the interior of said case is evacuated, and said raw material of solid electrolyte is introduced into this case that has been evacuated through an aperture (in the specification of this application, this will be called the second aperture, for example second aperture 3B of FIG. 2, to be described) other than the first aperture of said one or more apertures, by utilizing the difference in pressure with outside. This second aperture corresponds to an aperture for liquid introduction, of the one or more apertures mentioned above.

In this way, for example the benefit is obtained that deposition of the raw material of solid electrolyte on the case is reduced to the minimum, thereby enabling the load of subsequent cleaning to be reduced and also the benefit is obtained that the tendency for coating/impregnation of the raw material of the solid electrolyte into the interior of the capacitor body to be obstructed by the presence of air bubbles, etc. can be reduced, thereby making it possible to achieve reliable coating/impregnation.

Regarding the location of provision of the first aperture, provision of a wide aperture at one end of the case, such as 3A of FIG. 2, to be described, is preferable in that it facilitates insertion of the capacitor body.

Regarding the location of provision of the second aperture i.e. the aperture for introduction of liquid, preferably, this is provided in constricted form at the end on the opposite side to first aperture 3A, as 3B in FIG. 2, to be described. When manufacturing an aluminum solid electrolyte capacitor according to the invention of the present application, an operation is necessary of inverting the case in a condition with the liquid that has been introduced still present in the interior of the case; the constricted form of the aperture helps to easily prevent the liquid from overflowing. It is also desirable to provide a collar portion such as 3C in FIG. 2, to be described, at the aperture for liquid introduction. This is because, depending on the material of the case, final sealing of the aperture can easily be carried out by heat-welding this collar portion.

For the aforesaid fixing and sealing, any material may be employed so long as it conforms to the gist of the present invention. Specifically, conveniently, resin is employed that has fluidity and that loses this fluidity on subsequent solidification.

Taking into account the heat-resistance and the degree of non-fluidity of solidified resin, a hardening type resin is preferable. For example, epoxy resin, phenol resin, silicone resin, fluororesin, polyimide resin or modified forms of these can be employed. Of these, epoxy resin is particularly preferable from the point of view of diversity of properties and reliability etc.

When a hardening type resin such as epoxy resin is employed, in order to realize the aforementioned fixing/sealing, it is frequently necessary to arrange to dam (i.e. obstruct) the flow of the liquid sealant by inserting a solid plate (termed a sealant blocking member in this application) beforehand. It is also possible to give such a sealant blocking member a fixing function.

It should be noted that, although, in the present application, the resin for fixing or sealing is termed a sealant, this is not meant to imply that its application is restricted to sealing; use solely with the objective of fixing is also included.

Preferably in an aluminum solid electrolyte capacitor according to the present invention, a gap is provided between the capacitor body and the second aperture. This is because if such a gap is not ensured, the capacitor body blocks the aperture for liquid introduction. For this purpose, apart from suitably selecting the position of fixing or sealing of the capacitor body, it is effective to provide a projection in the interior of the case, as will be described.

Also, preferably, after the capacitor body has been coated or impregnated with the raw material of solid electrolyte, oxidizing agent for inducing an oxidative polymerization reaction of the raw material of solid electrolyte is introduced through the second aperture. Usually, if the oxidizing agent is co-present, the oxidative polymerization reaction according to the present invention will gradually proceed even at low temperature. Accordingly, it is desirable to mix the raw material of solid electrolyte and oxidizing agent and introduce this mixture into the case immediately thereafter. However, it has been discovered that there are no problems if, instead of doing this, after previously coating or impregnating the capacitor body with raw material of solid electrolyte, oxidizing agent for inducing the oxidative polymerization reaction of the solid electrolyte is introduced through the second aperture. It is thought that this is because, even in this way, contact of the raw material of solid electrolyte and the oxidizing agent can be achieved, sufficiently.

Preferably the raw material of solid electrolyte is 3,4-ethylenedioxy-thiophene.

Also, it is desirable to perform ageing during drying in a condition with the second aperture open after generation of the solid electrolyte by the oxidative polymerization reaction, or, after sealing and fixing of the capacitor body by epoxy resin in the interior of the case, prior to introduction of the raw material of solid electrolyte, to perform chemical conversion treatment by introducing chemical conversion liquid through the second aperture and passing current to the positive electrode, followed by washing and drying.

In addition, it is desirable to get rid of at least oxidizing agent present in the vicinity of the second aperture after introduction of the oxidizing agent.

Furthermore, when the raw material of solid electrolyte is introduced into the case, when the raw material and oxidizing agent are introduced, when other liquids such as washing liquid are introduced, during the chemical conversion treatment, during the ageing, etc., it is desirable to apply ultrasonic vibration. It is believed that this assists in removal of air bubbles, mixing of liquids, reduction of dead space, and in reaction promotion, etc. In particular, it is desirable to apply ultrasonic vibration when the raw material of solid electrolyte and oxidizing agent are introduced and during chemical conversion treatment or during ageing.

In the washing step, preferably washing is effected by immersing the second aperture in the tank that holds the washing liquid, followed by repeated pressure reduction and pressurization of the interior of the tank to cause inflow of the washing liquid into the case and its outflow from the case.

A further aspect of the present invention consists in:
an aluminum solid electrolyte capacitor component comprising:
a capacitor body;
a case in which this capacitor body is accommodated;
a sealant layer that fixes this capacitor body within this case and divides the interior of this case into two zones;
a sealant blocking member for arranging that this sealant does not penetrate into one of these zones of the case;
and an aperture provided in the zone in which it is arranged that this sealant does not penetrate, and
an aluminum solid electrolyte capacitor manufactured from such a component.

As described in the above, since the capacitor body is protected from external force by being within the highly rigid case from the very beginning, even if handling is somewhat rough, there is no risk of defects being produced by application of stress to the oxide film on the positive electrode, so an aluminum solid electrolyte capacitor of high reliability can be realized.

Other objects, advantages, and novel features of the invention will become more apparent from the following detailed description when taken in conjunction with the accompanying drawings and the table.

DESCRIPTION OF THE PREFERRED EMBODIMENTS

FIG. 2 is a detail cross-sectional side view illustrating an aluminum solid electrolyte capacitor at the stage where the third step according to the present invention as illustrated in FIG. 1 has been completed; in this Figure, 1 represents the capacitor body, 2 represent lead terminals, 3 represents the case, 3A represents the first aperture, 3B represents the second aperture, 3C represents a collar portion, 4 represents a sealant blocking member, and 5 represents a sealant, respectively.

Prior art techniques may be applied to produce the coiled element; one of the two lead terminals 2 illustrated is of course connected to the positive electrode foil, while the other is connected to the negative electrode foil, respectively.

Sealant blocking member 4 is fitted on to lead terminals 2 of the coiled element, and this is inserted into case 3 through first aperture 3A; sealant 5 such as epoxy resin is then introduced and cured so that the coiled element is fixed within case 3, thereby completing the illustrated construction. Sealant blocking member 4, as its name implies, has the role of inhibiting inflow of sealant 5 to capacitor body 1 and in addition has the role of locating the coiled element in position.

Thus, by fixing the coiled element within case 3 at the initial stage of the step, there can be no possibility of stress being applied to the capacitor body 1 even if the lead terminals 2 are pushed apart, and there can likewise be no possibility of stress being applied to capacitor body 1 even when case 3 is held in a subsequent processing step. In this case, it is desirable that not merely is the case 3 fixed but also, by the pouring in of this sealant, complete partitioning is effected into two zones, namely, the side of aperture 3A and the side of aperture 3B, so that when the air within the case is sucked out from aperture 3B, only the side of aperture 3B is maintained at a reduced pressure i.e. is put in a sealed condition. In the invention of the present application, "sealing of the capacitor body" is used in this sense. It should be noted that, hereinbelow, if simply the term "fixed" is employed, unless otherwise indicated or clear from the context, fixing and sealing may be included.

As the material 3, thermoplastic resin of high melting-point such as polyphenylene sulfide (PPS) resin is employed; this is capable of withstanding the solder reflow temperature, which has a peak value of about 240 (° C.); however, an aluminum case could also be employed having a construction with a first aperture 3A and second aperture 3B in the same way as case 3. Incidentally, the melting temperature of PPS resin is about 280 (° C.).

Sealant 5 must maintain its mechanical strength without deterioration of adhesion with the lead terminals 2 and/or case 3 even when subjected to solder reflow; thermosetting epoxy resin meets this objective.

After fixing the coiled element in case 3, the step flow shown in FIG. 1 runs through the steps: repeat chemical conversion→washing→heat treatment; however, these steps are only necessary if defects are produced in the oxide film on the positive electrode formed by chemical conversion executed during manufacture of the coiled element or if high manufacturing yield is required. Description thereof will therefore be postponed and the description will next refer to the production of the solid electrolyte.

Furthermore, the substance for producing the solid electrolyte must be introduced from the second aperture 3B and this substance must be converted into the solid electrolyte by processing; conventionally, however, such steps were not implemented, so some technology is required to realize these.

In this embodiment, 3,4-ethylenedioxy-thiophene is used as the raw material of solid electrolyte or conductive polymer material and iron (III) p-toluenesulfonate is used as an oxidizing agent.

Since 3,4-ethylenedioxy-thiophene is difficult to handle in high concentration, its fluidity is increased by dissolving it in ethanol and using it in the form of a 20 (wt %) solution. In the description below, this solution is referred to as the first liquid.

This first liquid is preferably introduced through second aperture 3B which is formed of small width, taking into account the need to completely seal case 3 subsequently; for this purpose, good results are obtained by application of the vacuum impregnation method.

Figure 3:
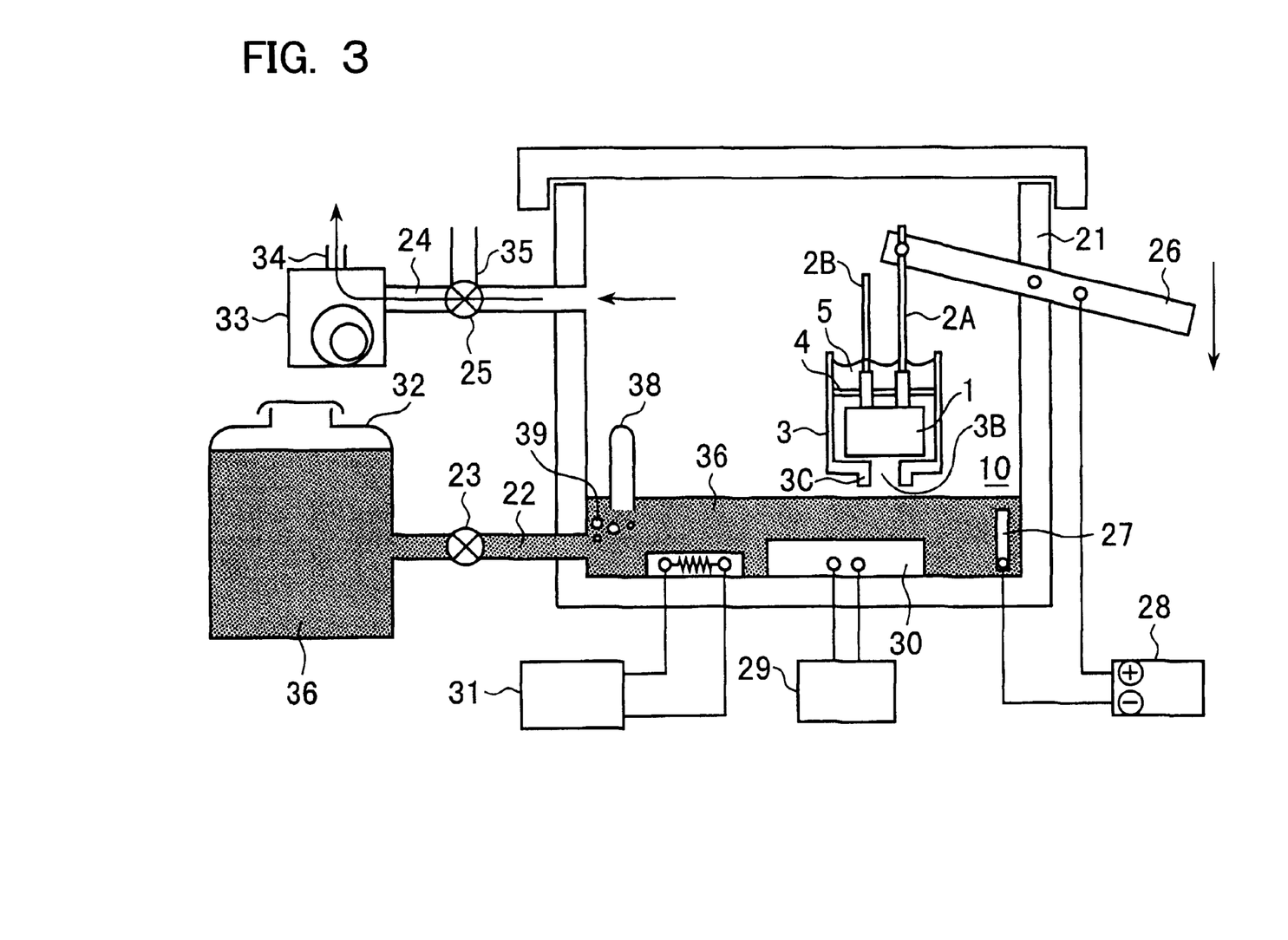
FIG. 3 is a diagrammatic detail cross-sectional side view given in explanation of an aluminum solid electrolyte capacitor and a device for manufacturing it at an important point of these steps.
Figure 4:
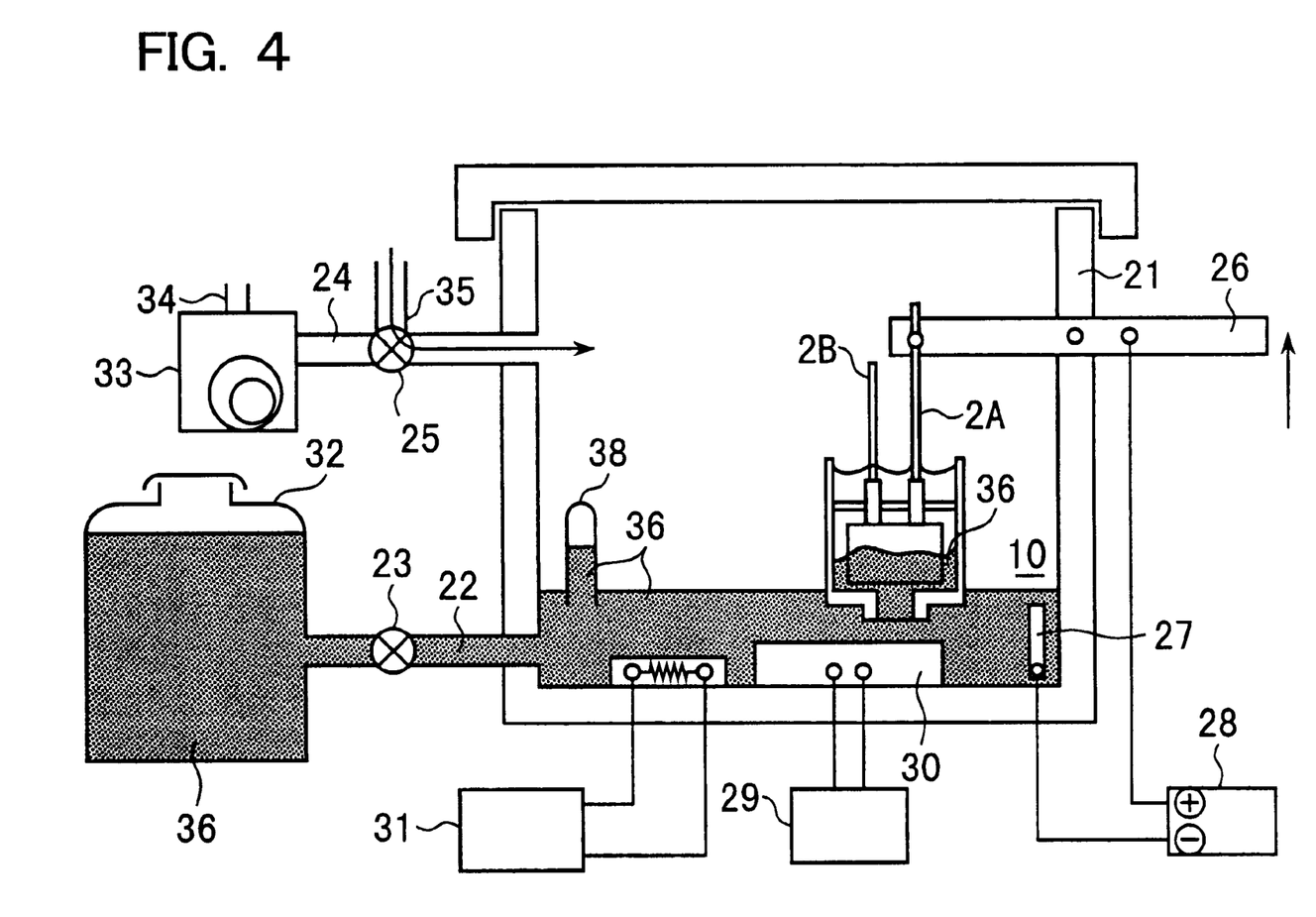
FIG. 4 is a diagrammatic detail cross-sectional side view given in explanation of an aluminum solid electrolyte capacitor and a device for manufacturing it at an important point of these steps.

FIG. 3 and FIG. 4 are diagrammatic detail cross-sectional side views given in explanation of an aluminum solid electrolyte capacitor and a device for manufacturing it at an important point of these steps; symbols which are the same as symbols used in FIG. 2 represent identical portions or have the same meaning.

In the Figures, 2A represents a positive electrode side lead terminal, 2B represents a negative electrode side lead terminal, 10 represents an aluminum solid electrolyte capacitor, 21 represents a vacuum impregnation tank, 22 represents a first liquid introduction conduit, 23 represents a valve, 24 represents an evacuation conduit, 25 represents a changeover valve, 26 represents a moveable capacitor support member that also provides a positive side power voltage supply path, 27 represents a negative electrode, 28 a DC power source, 29 an ultrasonic transducer, 30 an oscillator, 31 a liquid temperature control unit, 32 an electrolyte tank, 33 a vacuum pump, 34 an evacuation conduit, 35 an external air supply conduit, 36 first liquid, 38 a transparent cylinder having a closed bottom and 39 air bubbles, respectively. The major part of the aluminum solid electrolyte capacitor manufacturing device illustrated is the vacuum impregnation device.

The steps of manufacturing an aluminum solid electrolyte capacitor will now be described with reference to FIG. 3 and FIG. 4.

Referring to FIG. 3

3-(1)

As shown in the drawing, one end of moveable capacitor support member 26 that extends outside vacuum impregnation tank 21 is pressed down to a sufficient degree. In this condition, capacitor 10 is set in position within vacuum impregnation tank 21. In this case, this is implemented by having the aperture 3B of case 3 face the bottom of vacuum impregnation tank 21 and connecting the positive electrode side lead terminal 2A with the moveable capacitor support member 26.

3-(2)

Valve 23 is opened, allowing the required quantity of the first liquid 36 to be transferred into vacuum impregnation tank 21 from tank 32; valve 23 is then closed at the stage where the liquid level is maintained at the prescribed height.

If the vacuum impregnation operation is carried out continuously, the amount of first liquid 36 that is transferred from the first liquid tank 32 into vacuum impregnation tank 21 is such as to make up for the amount of consumption in the vacuum impregnation operation of the previous cycle.

In the condition illustrated, one end of the moveable capacitor support member 26 that extends outside vacuum impregnation tank 21 is depressed, so capacitor 10 is not yet in contact with first liquid 36.

3-(3)

The liquid temperature of first liquid 36 is maintained at an appropriate value by operating liquid temperature control unit 31.

Usually, control of the temperature of first liquid 36 is not necessary, but, since the various treatments involved in vacuum impregnation and repeat chemical conversion for generating oxide film on the positive electrode foil of capacitor body 1 have a relationship with the temperature of first liquid 36, suitable temperature control is preferably performed in accordance with the type thereof.

3-(4)

In this condition, communication of the interior of vacuum impregnation tank 21 with the external atmosphere is cut off by changing over changeover valve 25 so as to communicate with vacuum pump 33 and evacuation is performed by driving vacuum pump 33.

This causes the air pressure within vacuum evacuation tank 21 to fall, so the air within case 3 and the air within cylinder 38 having a closed bottom are diffused and expand, and so are gradually evacuated.

At this juncture, the flow of air evacuated from case 3 cannot be seen, but if the aperture of the cylinder 38 is immersed in first liquid 36 with its bottom up, the air evacuated from cylinder 38 forms air bubbles 39 which pass through the first liquid 36 and so are rendered visible. A test-tube made of ordinary glass can be employed as transparent cylinder 38.

As evacuation proceeds, at the time-point where the condition is produced in which air bubbles no longer appear from cylinder 38, it may be concluded that the air pressure within vacuum impregnation tank 21 has reached the target value and is being maintained at a fixed value.

See FIG. 4.

4-(1)

By allowing the depression of the portion of moveable capacitor support member 26 that extends to outside the vacuum impregnation tank 21 to return somewhat, a condition is produced in which second aperture 3B of case 3 in capacitor 10 is immersed in the first liquid 36. In this condition, there is no possibility of first liquid 36 entering the interior of case 3 or the interior of cylinder 38.

4-(2)

After stopping vacuum pump 33, external atmosphere is gradually introduced into vacuum impregnation tank 21 by changing over changeover valve 25 such that slight communication is effected with external atmosphere supply conduit 35.

In this way, when the first liquid 36 gradually enters the interior of case 3 and the interior of cylinder 38 and the liquid level reaches capacitor body 1, first liquid 36 is sucked up by the capillary action in the separator made of insulating paper which is inserted between the positive electrode foil and negative electrode foil with the result that the liquid level of capacitor body 1 becomes higher than the liquid level of case 3.

4-(3)

As introduction of external air proceeds further, the pressure within vacuum impregnation tank 21 rises, whereupon the liquid level of the first liquid 36 in case 3 rises further. The Figure shows the condition in which capacitor body 1 is being impregnated with first liquid 36.

4-(4)

When introduction of external air has been completed and the air pressure within vacuum impregnation tank 21 has reached atmospheric pressure, the interior of case 3 and cylinder 38 are filled with first liquid 36.

The amount of impregnation of first liquid 36 is determined in accordance with the type of capacitor, but, typically, may be about 60 (%) to 70 (%) of the volume in case 3, so the pressure reduction when effecting vacuum impregnation should be about 300 (hPa) to 400 (hPa).

After passing through the steps described above, the steps must be performed in which the first liquid 36 with which the capacitor 10 has been impregnated is then dried; however, if the second aperture 3B is left directed downwards, first liquid 36 would flow out; second aperture 3B must therefore be held facing upwards. It should be noted that the operation of inverting the position of the capacitor so that the second aperture 3B faces upwards can be performed with this aperture 3B still open. This is because there is little risk of the liquid flowing out if this operation is conducted within a short time.

Figure 5:
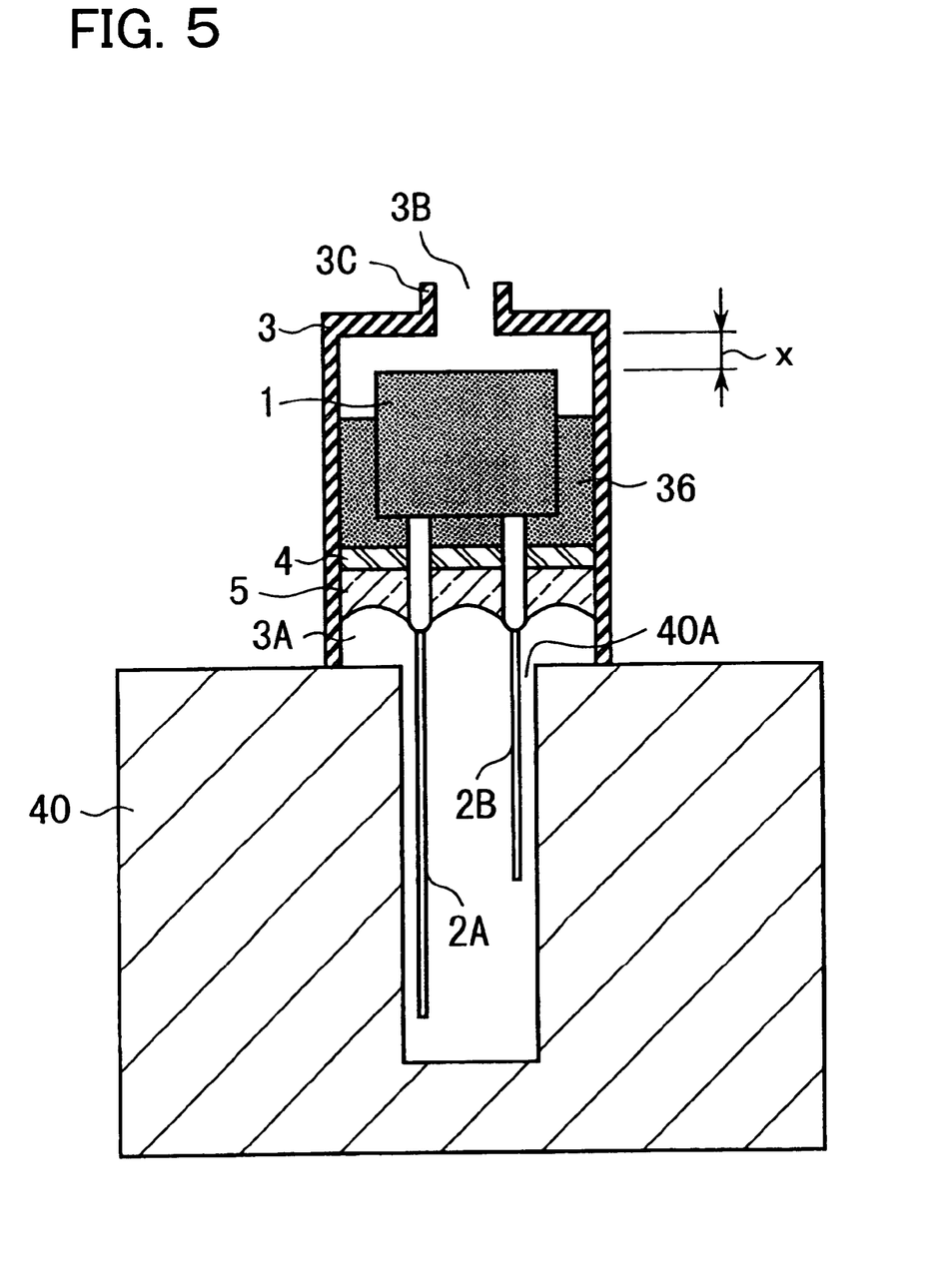
FIG. 5 is a detail cross-sectional side view illustrating a capacitor and a capacitor-mounting table in the drying step.

FIG. 5 is a detail cross-sectional side view illustrating a capacitor and a capacitor mounting table in the drying step; symbols which are the same as symbols used in FIGS. 2 to 4 represent identical portions or have the same meaning.

In the Figure, 40 represents a mounting table, 40A represents a recess that accommodates the lead terminals 2A and 2B of the capacitor, and x represents the gap between the upper surface of the capacitor body 1 and the wall surface on the side of the second aperture 3B in case 3 i.e. the interior surface of the upper wall, respectively.

Gap x illustrated in the Figure creates the necessary passage for communication with the outside through second aperture 3B and is preferably at least 0.1 (mm) or more, more preferably about 0.5 (mm).

According to market demands, external dimensions are required to be made as small as possible, so in conventional capacitors gap x was made 0. However, in the case of a capacitor according to the present invention, in such a case, drying of first liquid 36 would be insufficient, lowering reliability, so it is necessary to provide a gap x of the aforesaid order.

In order to maintain a gap x of this order, it is effective to provide a projection of height equal to the required gap x on the inside surface of the upper wall of case 3 such that the top surface of capacitor body 1 does not directly contact the upper wall surface of case 3.

Since the solvent of the first liquid 36 is ethanol, it is preferable to perform drying maintaining a temperature not exceeding its boiling point of 78.3 (° C.), for example 70 (° C.). Regarding the drying time, this is of course different depending on the size of the capacitor and on the size of second aperture 3B and is 30 (minutes) to 3 (hours) if the external dimensions of case 3 are 3.6 (mm)×3.6 (mm)×6.3 (mm) to 4.6 (mm)×4.6 (mm)×10.1 (mm) and the diameter ø of the second aperture 3B is 0.8 (mm).

When drying is completed, the internal surface and external surface of capacitor body 1 are covered with a film consisting of monomer of the conductive polymer material, so the solid electrolyte must be produced by producing an oxidative polymerization reaction by mixing this with oxidizing agent.

In this embodiment, as described above, iron (III) p-toluenesulfonate is employed as the oxidizing agent; this is employed in the form of a 50 (wt %) solution obtained by dissolving in n-butyl alcohol (melting point 117.7 (° C.)). In the following description, this liquid is referred to as the second liquid.

For introducing the second liquid into capacitor body 1 within case 3, vacuum impregnation is ideal. In order to achieve this, exactly the same means as in the case of the vacuum impregnation of the first liquid may be employed, but, since it is vital to ensure that no empty space in which the second liquid is absent is left within the capacitor body 1, preferably the pressure reduction is effected with a larger reduction in pressure than in the case of the first liquid, for example of the order 100 (hPa).

Consequently, immediately after vacuum impregnation with the second liquid has been effected, the interior of case 3 is in a condition in which it is filled with the second liquid as far as and including the second aperture 3B; then it is difficult to achieve drying when filling with the second liquid is effected in this way as far as the second aperture 3B.

Figure 6:
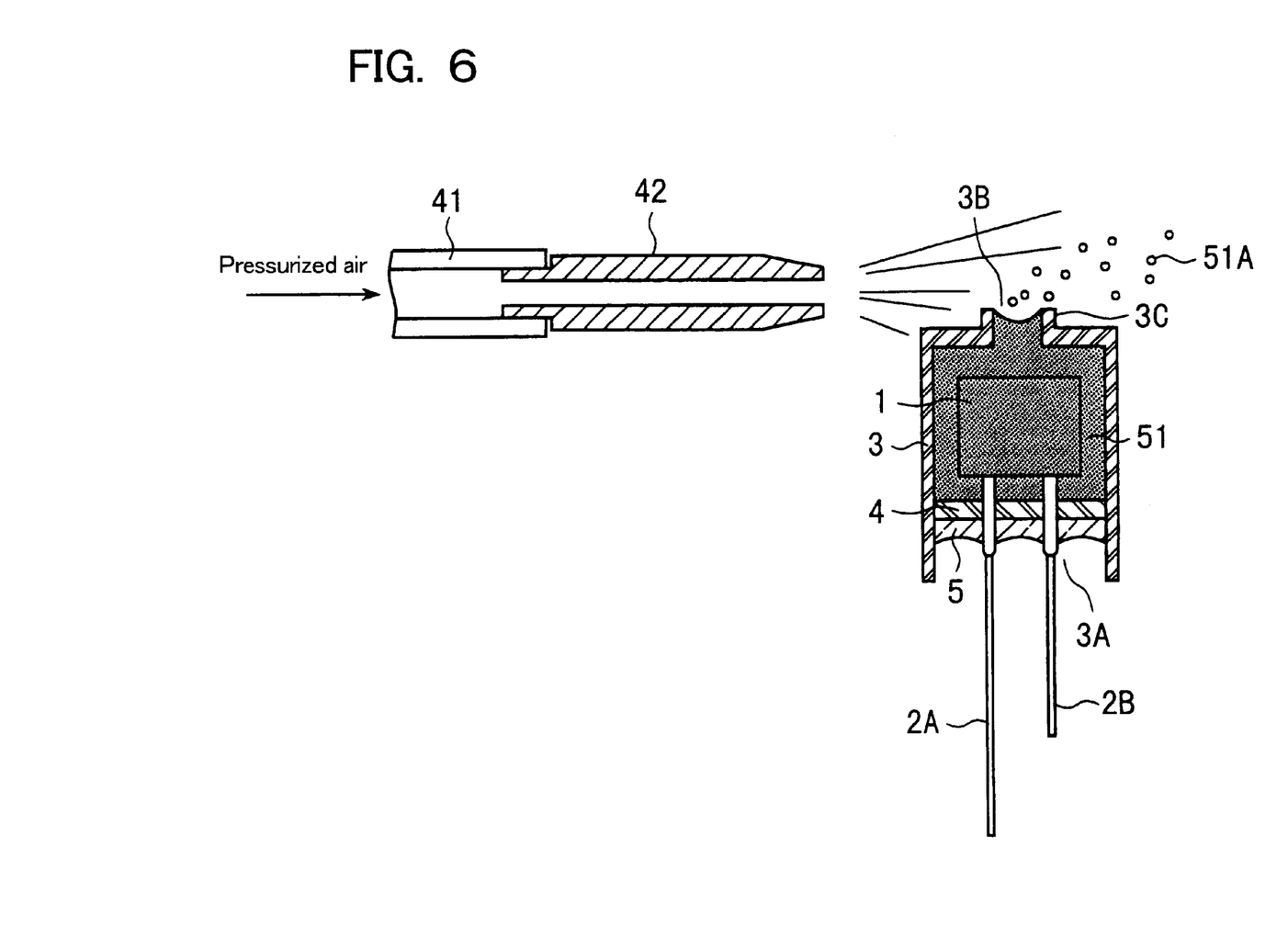
FIG. 6 is a diagrammatic detail view illustrating a capacitor and a removal device, given in explanation of the step wherein the second liquid that was introduced through the second aperture of the case is removed.

FIG. 6 is a diagrammatic detail view illustrating a capacitor and a removal device, given in explanation of the step wherein the second liquid that was introduced into the second aperture of the case is removed. Symbols which are the same as symbols used in FIG. 2 to FIG. 5 represent identical portions or have the same meaning.

In this Figure, 41 represents a pressurized air supply conduit, 42 represents a nozzle, 51 is second liquid, and 51A represents second liquid that is blown away, respectively.

As is clear from this Figure, capacitor 10 is stood upright, and pressurized air is blown on to it from nozzle 42, thereby expelling second liquid 51 present in the vicinity of second aperture 3B by blowing it away. Any second liquid adhering to the outside of case 3 during impregnation can also likewise be removed in this process.

Since the second liquid that is expelled from second aperture 3B at this point is excess solution present between capacitor body 1 and case 3, its expulsion can have no effect at all on the performance of the capacitor.

Since monomer constituting the first liquid is dissolved in ethanol that has excellent interface wettability, and then used for impregnating capacitor body 1, the ethanol is evaporated after the monomer has entered pores in the surface of the positive electrode foil, resulting a condition in which a thin film of the monomer is left on the surface; impregnation of this with the second liquid is then performed, so mixing of the monomer and the second liquid is carried out naturally. However, in order to further promote this mixing, it is effective to apply ultrasonic vibration. Variation of quality can thereby be reduced.

Immediately after impregnation of the second liquid, by the action of the iron (III) p-toluenesulfonate, a gradual oxidative polymerization reaction of the 3,4-ethylenedioxythiophene proceeds; during this period, as shown in FIG. 5, capacitor 10 is held upright with the second aperture 3B directed upwards, and the following heat treatment is performed to carry out oxidative polymerization and vaporization of the solvent comprising n-butyl alcohol.

First Stage

Treatment Temperature: 50 (° C.)
Treatment time: 3 (hours)

Second Stage

Treatment Temperature: 60 (° C.)
Treatment time: 3 (hours)

Third Stage

Treatment Temperature: 80 (° C.)
Treatment time: 10 (hours) to 30 (hours)

Fourth Stage

Treatment Temperature: 125 (° C.)
Treatment time: 2 (hours)

Fifth Stage

Treatment Temperature: 150 (° C.)
Treatment time: 1 (hour)

The treatment time of the heat treatment that is performed by applying a temperature of 80 (° C.) may be selected in accordance with the specifications such as capacitor size.

When the heat treatment at a temperature of 150 (° C.) is finished, oxidative polymerization of the 3,4-ethylenedioxythiophene is completed, producing poly(3,4-ethylenedioxythiophene). However, according to the present invention, an excellent effect is obtained by performing ageing by applying voltage at the stage where heat treatment at a temperature of 125 (° C.) and heat treatment at a temperature of 150 (° C.) are performed i.e. the stages prior to sealing of the second aperture 3B. "Ageing" in the invention of the present application means applying voltage between the electrodes of the capacitor whilst heating. In such heating, preferably the temperature around the capacitor is made 85° C. to 165° C. in order to promote ageing. As already described, this heating can also be utilized for heat treatment. It should be noted that if the heating temperature is too high this is undesirable since it causes deterioration of performance. Also, the voltage that is applied is a DC voltage and is preferably 1.1 times to 2.0 times the product rated voltage. It is undesirable that it should be too low, since this lowers the reliability of the product. Also, it is undesirable that it should be too high, since this may cause insulation defects. Furthermore, for reasons which will be described, it is preferable that some moisture should be present within the capacitor.

It is well known to employ "ageing" in the field of ordinary aluminum electrolytic capacitors for the purpose of "repair of the oxide film"; also, it is considered that in aluminum solid electrolyte capacitors there is basically no repair action of the oxide film as there is in electrolytic capacitors.

However, it has experimentally been observed that leakage current is reduced by applying voltage load under conditions of high temperature to a completed aluminum solid electrolyte capacitor, with passage of a long time.

It is believed that this occurs because aluminum that is exposed at defect regions of the positive electrode foil is oxidized by oxygen generated by electrolysis of traces of moisture present in the capacitor by leakage current; ageing is therefore effective even in aluminum solid electrolyte capacitors.

However, it is essential that such ageing is performed after capacitor body 1 has been fixed in case 3; if ageing is performed in a condition in which capacitor body 1 is not fixed in case 3, stress will inevitably be applied to capacitor body 1 in subsequent steps, with a considerable likelihood of negating the benefits of ageing.

Even in the conventional techniques, (see for example Laid-open Japanese Patent Application Publication No. H. 10-50558 and Laid-open Japanese Patent Application Publication No. H. 10-50560), in order to avoid the problems of ageing without fixing the capacitor body in the case, as shown in FIG. 7, these are performed after fixing.

However, in the prior art, the fixing of the capacitor body in the case by adhesion with epoxy followed by curing is directly synonymous with sealing of the case i.e. hermetic sealing thereof, and at this stage there is a condition of moisture deficiency, so the benefits of ageing cannot be fully realized.

In comparison, according to the present invention, it is possible to perform ageing simultaneously with the heat treatment at the heat treatment stage prior to sealing of the second aperture 3B, at which stage capacitor body 1 is already fixed in case 3; furthermore, ageing is performed in a condition in which a sufficient amount of moisture is present in case 3 to enable the benefits of ageing to be fully achieved, the excess moisture being subsequently thoroughly expelled through the second aperture 3B before sealing.

In the present invention, a test has been conducted of a step of performing ageing after hermetic sealing of case 3 i.e. after sealing of second aperture 3B; however, since, in the condition in which heat treatment for the aforesaid oxidative polymerization and drying off of solvent has been completed, solvent/moisture has been completely evaporated, and the benefits of ageing may be insufficient; however, if necessary, there is no reason why this should not be performed.

Thus, although, as mentioned above, in the present invention, the steps: repeat chemical conversion→washing→heat treatment shown in FIG. 1 are not essential, performance of these steps is desirable from the point of view of improving performance of the capacitor. Hereinbelow, therefore, performance of these will be described.

Ordinarily, both in the cases of aluminum electrolytic capacitors and aluminum solid electrolyte capacitors, surface area is increased by subjecting the positive electrode foil to etching and treatment is performed to generate oxide film by passing a chemical conversion current in the chemical conversion liquid. In this case, productivity is improved by continuously performing the processes while uncoiling aluminum foil which is previously coiled on a roll of large width.

Consequently, in order to produce coiled elements, it is necessary to cut the aluminum foil up into portions of small width and short length. No oxide film is therefore present on these cut faces. Also, lead terminals must be connected to the electrode foil which is manufactured in this way. The oxide film is frequently damaged during these steps.

In the case of an ordinary aluminum electrolytic capacitor i.e. a capacitor employing liquid electrolyte, the liquid electrolyte has a powerful self-repairing capability, so damage to the oxide film can be repaired in the ageing step after assembly. However, in the case of an aluminum solid electrolyte capacitor, this basically has no self-repairing capability, so it is desirable to repair any defective portions of the oxide film such as for example at the cut faces of the electrode foil, by repeat chemical conversion.

As the standard chemical conversion solution, a solution obtained by dissolving 0.1 (g) of phosphoric acid in 1 (liter) of 2 (% by weight) to 3 (% by weight) aqueous solution of ammonium adipate may be employed. However, apart from this, various other solutions may be employed such as an aqueous solution of ammonium borate; these may be selected in accordance with the type of chemical conversion voltage and/or electrode foil. Also, since the temperature of the chemical conversion solution affects the performance of the oxide film, control to a predetermined temperature is necessary.

As repeat chemical conversion treatment proceeds, the oxide film grows and the chemical conversion current gradually decreases; by applying ultrasonic vibration during this step, good contact of the chemical conversion solution and oxide film can be achieved and even small defective portions can be repaired.

As is clear from FIG. 7, although in the repeat chemical conversion treatment in the conventional manufacturing process the operations of impregnation of chemical conversion solution/washing can be performed without difficulty, since they are performed in a condition with the coiled element not yet accommodated in the case, if such means are adopted, no matter how well deposition of the oxide film is performed, until it is fixed by being accommodated in the case it has scarcely any resistance to external force, so even if extreme care is exercised in the subsequent steps, it is impossible to perform these operations without subjecting the coiled element to stress.

For example, stress may be applied to the electrode foil to which the leading terminals are connected when this is moved by holding the leads, and stress may be applied to the electrode foil even by simply placing the coiled element on a tray, not to speak of stacking the coiled element etc.

Although, in the present invention, the various steps: repeat chemical conversion→washing→heat treatment shown in FIG. 1 can be performed while in the coiled element condition, it is not possible, in such a case, to avoid application of stress to the oxide film in the steps in which assembly in the case and adhesion/curing of epoxy resin are effected.

Accordingly, according to the present invention, when performing repeat chemical conversion treatment, this is carried out after fixing of the coiled element 1 in case 3. Then, this must be carried out through second aperture 3B, which is made small in order to make the final sealing of the case easily and without fail. Thus, good results are obtained if the same means are adopted as in the case of vacuum impregnation of the first liquid and second liquid described above.

That is, the repeat chemical conversion treatment can be performed by practically the same steps as described with reference to FIG. 3 and FIG. 4, replacing the first liquid or second liquid by the chemical conversion solution, the operations performed by the illustrated manufacturing equipment being practically the same. However, some supplementary description is necessary.

In the vacuum impregnation tank 21 shown in FIG. 3, the second aperture 3B of case 3 is held separated from the liquid surface and evacuation of the interior of the impregnation tank 21 is performed by operating vacuum pump 33. In this process, air within case 3 is of course expelled through the second aperture 3B.

As shown in FIG. 4, after the second aperture 3B in case 3 has been inserted into the chemical conversion solution, external atmosphere is introduced into vacuum impregnation tank 21 so that the interior of case 3 is completely filled with chemical conversion solution; chemical conversion voltage is then applied.

When positive chemical conversion voltage is applied to the positive electrode foil and negative chemical conversion voltage is applied to the negative electrode 27 which is provided immersed in the chemical conversion solution, respectively, the chemical conversion current flows from the positive electrode foil through the second aperture 3B to the negative electrode 27. Lead terminal 2A of capacitor 10 is connected to the positive electrode foil.

When chemical conversion current as described above flows, electrolysis of the water occurs, resulting in oxygen being generated at the positive electrode foil; the aluminum is thereby oxidized, producing an aluminum oxide film, while hydrogen is generated at negative electrode 27 and is discharged into the impregnation tank 21. In this process, the temperature of the chemical conversion solution has a close relationship with the performance of the chemical conversion film i.e. the oxide film, so control must be exercised such that the temperature is always constant; usually the temperature will be 40 (° C.) to 60 (° C.).

In repeat chemical conversion, by operating the ultrasonic transducer 29 and oscillator 30 as shown in FIG. 4, ultrasonic vibrations are applied to the positive electrode foil through the chemical conversion solution, thereby enabling chemical conversion to be promoted.

The time for performance of the repeat chemical conversion is of the order of 10 (minutes) to 60 (minutes), but, if required, this could be further repeated at will after completion of the subsequent steps of washing, drying and heat treatment.

When repeat chemical conversion has been completed, the chemical conversion solution must be removed from the case 3, and washing and drying performed.

In the prior art, when treatment is performed while still at the coiled element stage, immersion in a current of pure water for a fixed time, for example of the order of 10 (minutes) to 30 (minutes) is satisfactory. In the present invention, however, since the capacitor body 1 is fixed in the case 3, washing cannot be achieved simply by immersion in a current of water, so the means described below are preferably adopted.

If, as shown in FIG. 3, capacitor 10 in vacuum impregnation tank 21 is held with second aperture 3B directed downwards, and the pressure is reduced by operation of vacuum pump 33, the chemical conversion solution in case 3 is expelled from the second aperture 3B.

When this is done, if the pressure reduction is considerable, the amount of chemical conversion solution expelled is large, but if a large number are processed simultaneously, expulsion variability occurs, so, preferably, pressure reduction is conducted twice, as described below. Specifically:

> Atmospheric pressure (1013 (hPa)→pressure reduction (100 (hPa) to 200 (hPa))→Atmospheric pressure (1013 (hPa)→pressure reduction (100 (hPa) to 200 (hPa))→Atmospheric pressure (1013 (hPa)).

Although the chemical conversion solution present between the case 3 and capacitor body 1 is expelled by going through the aforesaid steps, the capacitor body is still in a condition in which it is wet with chemical conversion solution, so subsequent washing is necessary.

If pressure reduction/restoration of atmospheric pressure is repeated with the second aperture 3B immersed into the washing liquid, the solution shown in FIG. 4 being replaced with the washing liquid, the washing liquid within case 3 when pressure reduction is effected is expelled through the second aperture 3B and the washing liquid within case 3 is forced in through second aperture 3B on restoration of atmospheric pressure, so the washing liquid functions in the same way as a water current.

The aforesaid pressure reduction being of the order 200 (hPa) to 300 (hPa), even when washing liquid is forced into case 3 by restoration to atmospheric pressure, if it is arranged for some air bubbles to be left within case 3, the washing liquid is efficiently circulated.

Any washing liquid can be employed so long as it is capable of washing out the chemical conversion solution and normally pure water is ideal. The temperature of the washing liquid affects the speed of washing and is preferably maintained at about 40 (° C.) to 80 (° C.); furthermore, in the case of washing also, the washing effect is promoted by simultaneously employing ultrasonic vibration. The same means as for expulsion of the chemical conversion liquid may be adopted for expulsion of the washing liquid within case 3.

After the washing liquid in case 3 has just been expelled, capacitor body 1 is still in a wet condition, so drying is performed by heating. This drying can be carried out combined with heat treatment for quality modification of the chemical conversion film and/or heat treatment for quality modification of the insulating paper. The heat treatment conditions depend on the objective, but typically the temperature should be about 100 (° C.) to 270 (° C.) and the time about 10 (minutes) to 60 (minutes).

A single cycle of repeat chemical conversion treatment is completed by the steps described above, but, as described above, since an aluminum solid electrolyte capacitor has no oxide film self-repairing action, formation of a good quality oxide film prior to generating the solid electrolyte is extremely important in improving reliability. In order to realize an aluminum solid electrolyte capacitor of high reliability, repeat chemical conversion treatment is therefore preferably repeated over a plurality of cycles.

Usually, all the apertures are sealed at the end of operation. In the case of an aperture such as aperture B this can be effected by sealing with resin.

EXAMPLE 60 samples were prepared by the steps of:

adhesion of coiled elements with epoxy resin followed by curing in cases 3 of external dimensions 3.6 (mm)×3.6 (mm)×9.8 (mm);

performing two cycles of repeated chemical conversion by the means described above;

impregnating with a solution obtained by dissolving 20 (%) of 3,4-ethylenedioxy-thiophene in ethanol by the means described above, then drying;

impregnating with a solution obtained by dissolving 50 (%) of iron (III) p-toluenesulfonate in n-butyl alcohol to form the solid electrolyte, etc.

When determinations were carried out on all these samples, excellent results were obtained in that only three samples were deemed to be defective since their equivalent serial resistance (ESR) at 100 (kHz) exceeded 150 (mΩ), the remaining 57 samples being good products.

From among the good products, 10 products were randomly selected and reflow soldering performed on these. When a life test was conducted with a temperature of 105 (° C.) whilst applying the rated voltage of 6.3 (V), the data as shown in Table 1 below were obtained. From these it can be seen that extremely stable performance is obtained. The data are average values of the 10.

TABLE 1

|  | 120 Hz Capacity (μF) | 120 Hz tanδ | 100 KHz ESR (mΩ) | Leakage current (μA) |
|---|---|---|---|---|
| Initial value | 31.3 | 0.095 | 89.5 | 1.12 |
| After reflow soldering | 30.3 | 0.092 | 112.2 | 1.93 |
| 105° C.  250 Hr | 29.1 | 0.088 | 115.3 | 0.87 |
| 105° C.  500 Hr | 29.1 | 0.082 | 117.5 | 0.75 |
| 105° C. 1000 Hr | 29.4 | 0.081 | 118.6 | 0.72 |

The present invention is not restricted to the embodiments described or illustrated in the drawings, tables, examples of trial manufacture, and others in the present specification, and many other modifications can be realized without departing from the scope of the patent claims.

For example, although, in the above embodiment, for the capacitor body, an element was employed obtained by coiling with a separator sandwiched between the positive electrode foil and negative electrode foil, flat plate-shaped aluminum electrodes could be employed for the positive electrode and negative electrode.

Also, although, in the above embodiment, in order to produce the solid electrolyte, the raw material for the conductive polymer material 3,4-ethylenedioxy-thiophene was dissolved in a solvent and the oxidizing agent iron (III) p-toluenesulfonate was dissolved in another solvent, impregnation being carried out twice, it would be possible to prepare a mixed solution of the raw material for the conductive polymer material and oxidizing agent and to perform impregnation only once.

This has the advantage that the number of steps is reduced, but, since the polymerization reaction proceeds, albeit gradually, in the mixed solution, the solution cannot be stored but must be made up on each occasion immediately prior to impregnation; furthermore, containers etc. that have come into contact with the mixed solution must be washed on each occasion and the rate of utilization of the expensive raw materials is poor.

In this regard, if the means described in the foregoing embodiment is adopted of effecting separate impregnation with the first liquid and the second liquid, so long as care is taken that these two liquids are not mixed, there is no risk of changing in quality and 100 (%) of the expensive raw material can be effectively utilized. However, which of these means is selected may be determined in accordance with need. In the case where the positive electrode and negative electrode are formed as flat sheets as described above, equipment as shown in FIG. 3 and FIG. 4 may be employed in the same way as described above, but the covering with solution is effected in a state closer to coating than to impregnation therewith.

As the raw material for the conductive polymer material, apart from the 3,4-ethylenedioxy-thiophene cited in the embodiment, various other substances may be employed such as pyrrole, furan, aniline, an acene, acetylene, and thiophenol, and 3,4-ethylenedioxy-thiophene is particularly preferred.

By employing a method of manufacturing an aluminum solid electrolyte capacitor according to the present invention, and providing a component being manufactured with the construction according to the present invention, the capacitor body, that is from the very beginning within a case of high rigidity, is protected from external force, so even if handling is somewhat rough, there is no risk of defects being generated by application of stress to the oxide film on the positive electrode. An aluminum solid electrolyte capacitor of high reliability can therefore be realized. Also, the fact that, according to the embodiment of the invention of the present application, the manufacturing operation can be performed in a more rationalized fashion is a useful benefit. Specifically, the operations of liquid introduction and washing etc. utilizing differential pressure can be performed in a rational fashion and so are beneficial in particular in regard to the manufacture of aluminum solid electrolyte capacitors in which a risk of deterioration of product quality is produced by even a very small degree of stress.

Further considerable benefits that may be cited include improvement in the final product quality and product yield. It is inferred that these benefits are not derived solely from the fact that the capacitor body is fixed and protected, but also may be a result of the fact that the method of manufacture in accordance with the invention of the present application makes it possible to perform in a stable manner the treatments accompanying chemical reactions such as the oxidative polymerization reaction, chemical conversion treatment and ageing with excellent reproducibility and while enabling stress to be reduced.

It should be noted that in manufacturing an aluminum solid electrolyte capacitor the benefits of the invention of the present application can be achieved advantageously in particular by having its components include: a capacitor body; a case that accommodates this capacitor body; a sealant layer that fixes this capacitor body within this case and that divides the interior of this case into two zones; a sealant blocking member for preventing penetration of this sealant into one of the zones of this case; and an aperture provided in the zone into which penetration of this sealant is prevented; and that an aluminum solid electrolyte capacitor manufactured in this way has high quality stability.

What is claimed is:

1. A method of manufacturing an aluminum solid electrolyte capacitor, comprising:

fixing a capacitor body within a case having two or more apertures; and generating solid electrolyte by introducing a raw material of solid electrolyte from at least one of these apertures, coating or impregnating the capacitor body therewith, and inducing an oxidative polymerization reaction thereof.

2. The method of manufacturing an aluminum solid electrolyte capacitor according to claim 1, wherein the capacitor body is inserted into the case from one of said two or more apertures (first aperture), and in the fixing the capacitor body, sealing is effected together with the fixing; the interior of said case is evacuated, and said raw material of solid electrolyte is introduced into this case that has been evacuated through an aperture (second aperture) other than the first aperture by utilizing the difference in pressure with outside.

3. The method of manufacturing an aluminum solid electrolyte capacitor according to claim 2, wherein an epoxy resin is employed for said sealing.

4. The method of manufacturing an aluminum solid electrolyte capacitor according to claim 2, wherein a gap is provided between the capacitor body and the second aperture.

5. The method of manufacturing an aluminum solid electrolyte capacitor according to claim 2, wherein, after coating or impregnating the capacitor body with the raw material of solid electrolyte, an oxidizing agent is introduced through the second aperture in order to induce an oxidative polymerization reaction of the raw material of solid electrolyte.

6. The method of manufacturing an aluminum solid electrolyte capacitor according to claim 2, wherein, after generating solid electrolyte by the oxidative polymerization reaction, aging is performed while performing drying in a condition with the second aperture open.

7. The method of manufacturing an aluminum solid electrolyte capacitor according to claim 2, wherein, after sealing and fixing the capacitor body within the case by the use of an epoxy resin, prior to introduction of the raw material of the solid electrolyte, chemical conversion treatment is performed by introducing chemical conversion liquid through the second aperture and passing current to the positive electrode, and washing and drying are then performed.

8. The method of manufacturing an aluminum solid electrolyte capacitor according to claim 2, wherein said raw material of solid electrolyte is 3,4-ethylenedioxy-thiophene.

9. The method of manufacturing an aluminum solid electrolyte capacitor according to claim 5, wherein, after introducing the oxidizing agent, at least the oxidizing agent in the vicinity of the second aperture is expelled.

10. The method of manufacturing an aluminum solid electrolyte capacitor according to claim 5, wherein, after introducing the raw material of the solid electrolyte and the oxidizing agent, mixing is promoted by applying ultrasonic vibration.

11. The method of manufacturing an aluminum solid electrolyte capacitor according to claim 7, wherein ultrasonic vibration is applied during chemical conversion treatment.

12. The method of manufacturing an aluminum solid electrolyte capacitor according to claim 7, wherein washing is performed by effecting inflow and discharge of washing liquid within the case by immersing the second aperture in a tank in which washing liquid is held and repeating pressure reduction and pressurization of the interior of the tank.

* * * * *